United States Patent [19]

Brown

[11] Patent Number: 5,004,537
[45] Date of Patent: Apr. 2, 1991

[54] OZONE WATER PURIFICATION SYSTEM

[76] Inventor: James J. Brown, 43 Oregon La., Boca Raton, Fla. 33487

[21] Appl. No.: 452,307

[22] Filed: Dec. 19, 1989

[51] Int. Cl.⁵ .............................................. C02F 1/78
[52] U.S. Cl. ..................................... 210/192; 210/202; 210/257.1; 210/305; 210/307; 210/521
[58] Field of Search ............... 210/192, 202, 220, 256, 210/257.1, 305, 307, 521, 201, 254

[56] References Cited

U.S. PATENT DOCUMENTS

| | | | |
|---|---|---|---|
| 882,240 | 3/1908 | Fender | 210/206 |
| 2,782,929 | 2/1957 | Colket | 210/532.1 |
| 3,425,913 | 2/1969 | Holden | 210/521 |
| 3,660,277 | 5/1972 | McWhirter et al. | 210/192 |
| 3,756,410 | 9/1973 | Moody et al. | 210/192 |
| 4,021,347 | 5/1977 | Teller et al. | 210/220 |
| 4,104,166 | 8/1978 | LaRaus | 210/256 |
| 4,250,040 | 2/1981 | LaRaus | 210/760 |
| 4,308,136 | 12/1981 | Warne, Jr. | 210/519 |
| 4,325,823 | 4/1982 | Graham | 210/170 |
| 4,385,986 | 5/1983 | Jaisinghani et al. | 210/521 |
| 4,722,800 | 2/1988 | Aymong | 210/521 |
| 4,804,478 | 2/1989 | Tamir | 210/169 |
| 4,849,115 | 7/1989 | Cole et al. | 210/192 |
| 4,925,552 | 5/1990 | Bateson et al. | 210/255 |

FOREIGN PATENT DOCUMENTS 139271  5/1934  Austria .

Primary Examiner—Richard V. Fisher
Assistant Examiner—Christopher Upton
Attorney, Agent, or Firm—Bacon & Thomas

[57] ABSTRACT

A closed loop, zero discharge, ozone water purification system is disclosed which allows the user to remove the contaminants from water and store the cleaned water for future use. The system includes a ozone/settling tank having baffles to divide the interior of the tank into several chambers. The baffles extend across the tank's interior and define water passages to allow the water to pass from one chamber to the next. The height of the water passages from the bottom of the tank progressively decreases in a downstream direction. Ozone is injected into the water in each of the chambers through an ozone distribution conduit passing longitudinally through each baffle.

8 Claims, 4 Drawing Sheets

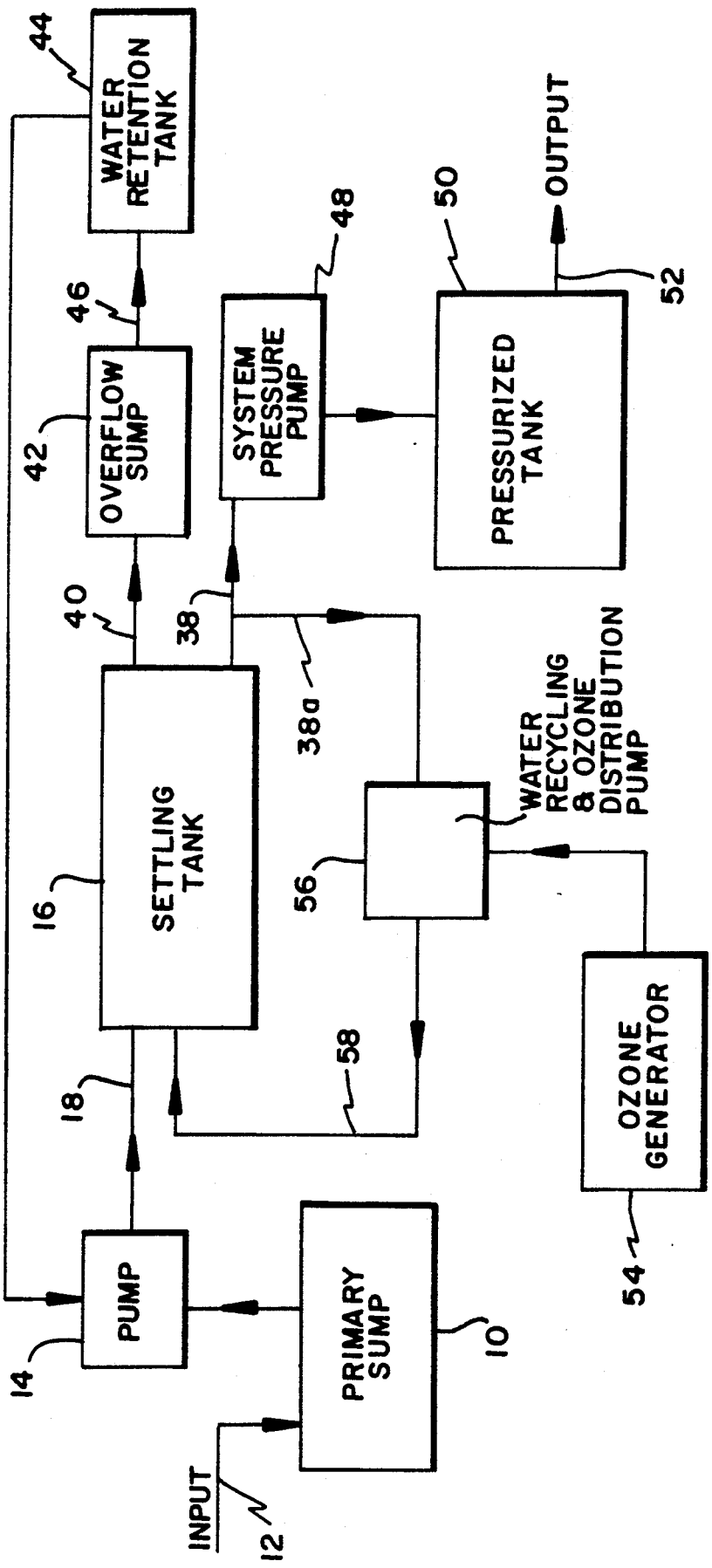
FIG_1

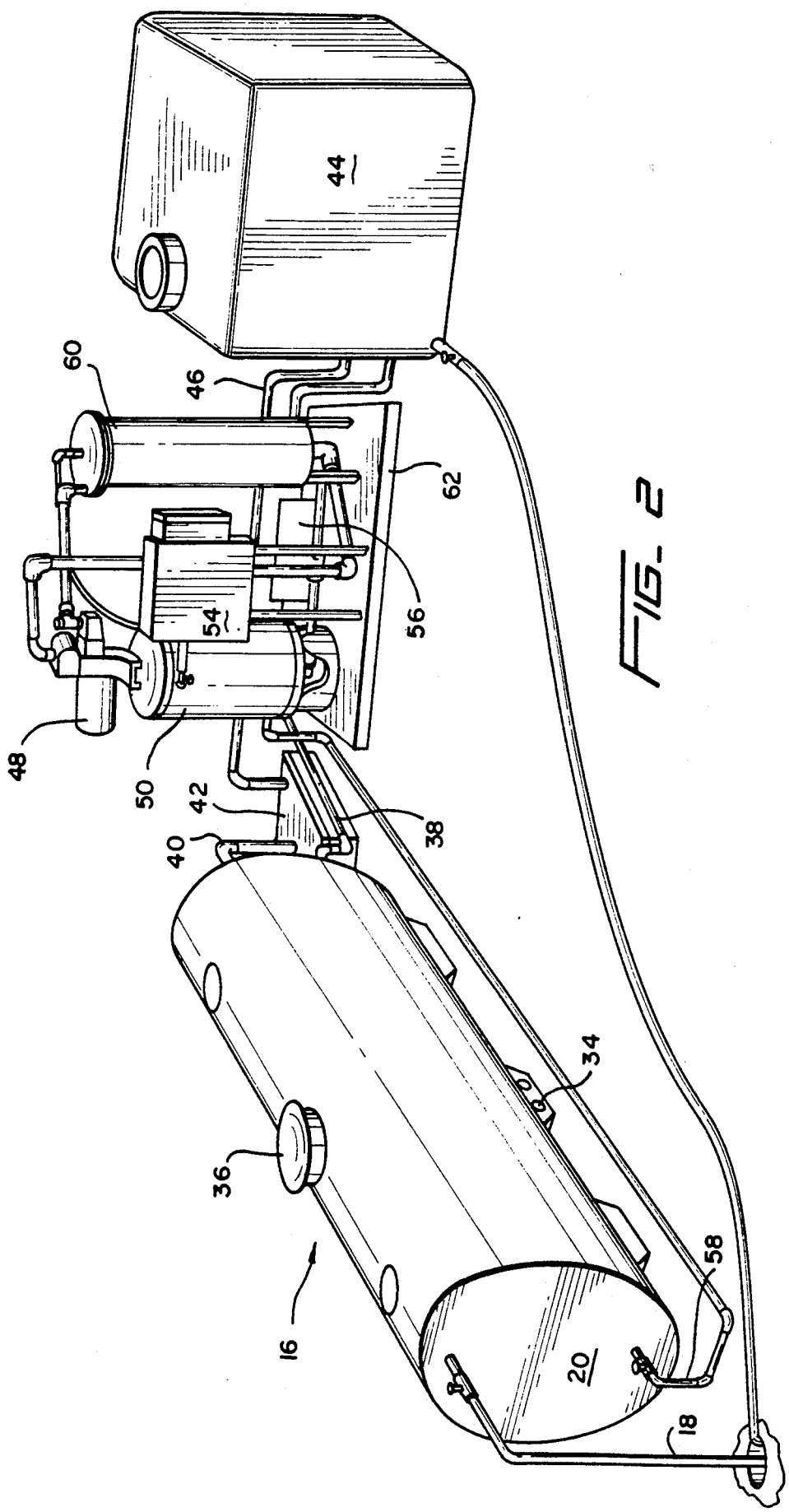

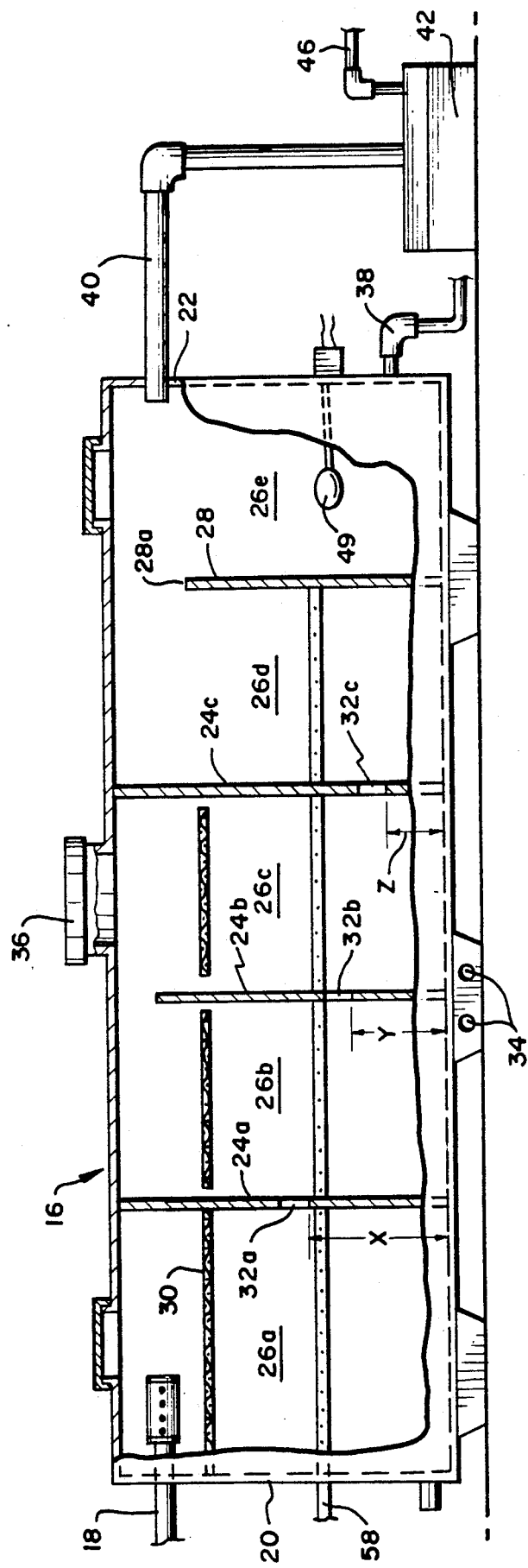
FIG_3

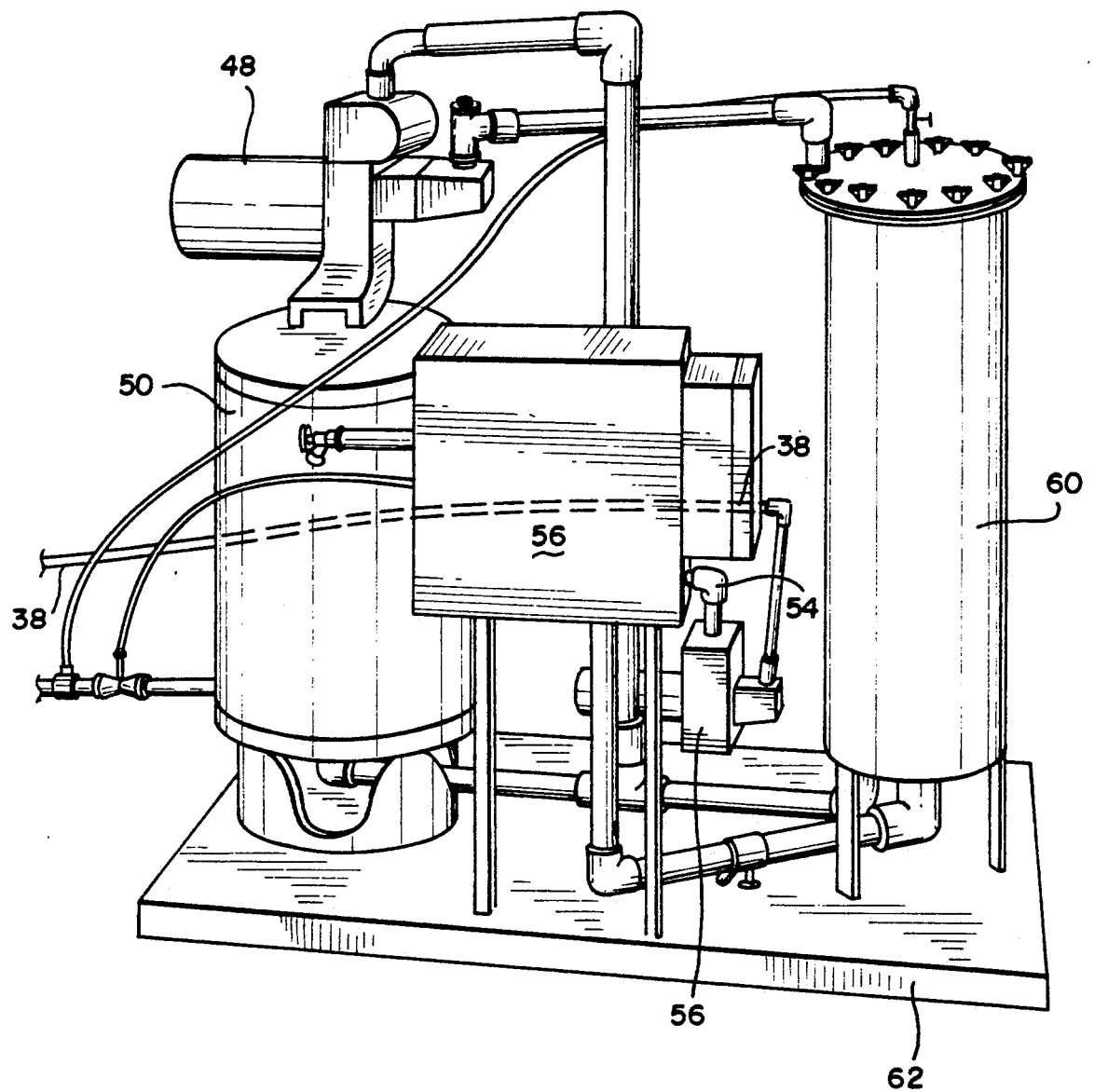
FIG_4

OZONE WATER PURIFICATION SYSTEM

BACKGROUND OF THE INVENTION

The present invention relates to a system for removing the contaminates from water, more particularly a closed loop, zero discharge system for use with industrial washing equipment.

Many businesses use steam cleaners or pressure-water cleaners to remove grease, oil, etc. from all types of machinery. These systems are well known and typically involve the spraying of steam or pressurized water onto the machinery.

The waste water, contaminated by the grease, oil, anti-freeze, fuel products and/or other petroleum based products discharged directly onto the ground constitutes a major cause of ground water pollution. Thus, it is a policy of many waste water treatment facilities that no water that has been contaminated by any petroleum-based product should be discharged into a municipal sewer system unless specified procedures and standards have been met. It is the responsibility of each individual business owner to install a system which will eliminate the contaminants from their waste water in order to allow them to meet the required standards.

It is also known to use ozone to clean water. Typical systems using ozone can be found in U.S. Pat. Nos. to Teller et al. (4,021,347), Laraus (4,104,166 and 4,250,040) and Tamir (4,804,478). Ozone has been found to be a powerful oxidant and is 600 to 3000 times more active against bacteria than chlorine in similar concentrations. In addition to being more effective than chlorine, ozone does not exhibit the drawbacks of chlorine, such as odor and/or skin irritation.

However, the difficulties in generating and distributing the ozone throughout the water to be treated has prevented the widespread usage of ozone purifications systems.

SUMMARY OF THE INVENTION

The present invention relates to a closed loop, zero discharge system which allows the user to remove the contaminants from water and store the cleaned water for future use. The system includes a ozone/settling tank having baffles to divide the interior of the tank into several chambers. The contaminated water passes into an upstream chamber, through successive chambers in a downstream direction and may be withdrawn from a downstream chamber.

The baffle members extend across the tank's interior and define water passages to allow the water to pass from one chamber to the next. The height of the water passages from the bottom of the tank progressively decreases in a downstream direction.

A water level control baffle extends across the tank in the downstream chamber and has a top spaced from the top of the tank to define an overflow weir. Clarified water may be withdrawn from the downstream side of the water level control baffle and transferred to a storage tank, or reused immediately.

Ozone is injected into the water in each of the chambers through an ozone distribution conduit passing longitudinally through each baffle along the central axis of the tank. One end of the ozone distribution conduit is connected to an ozone generator. The walls of the ozone distribution conduit may be perforated in each of the chambers to distribute the ozone into the water contained within each chamber.

BRIEF DESCRIPTION OF THE DRAWINGS

FIG. 1 is a schematic diagram of the system according to the invention.

FIG. 2 is a perspective view of the elements of the system according to the invention.

FIG. 3 is a side view of the ozone/settling tank according to the invention.

FIG. 4 is a perspective view of the pressurized bladder-filter system used in the system according to the invention.

DETAILED DESCRIPTION OF THE PREFERRED EMBODIMENT

As illustrated best in FIGS. 1 and 2, the system according to the invention comprises a primary sump 10 into which the contaminated water from the pressurized water or steam cleaner (not shown) passes via inlet 12. The water entering the primary sump 10 may be contaminated by grease, oil, anti-freeze, fuel products or other petroleum based products. Pump 14, which may be submerged in primary sump 10, pumps the contaminated water from the primary sump 10 into an upstream end of the ozone/settling tank 16 through tank inlet conduit 18.

As best illustrated in FIG. 3, the ozone/settling tank 16 has an upstream end 20, a downstream end 22 and a plurality of baffle members 24a, 24b and 24c extending across the entire interior of the tank 16. Although three baffle members (24a, 24b and 24c) are illustrated, it is to be understood that more or less than this number may be utilized without exceeding the scope of this invention.

The baffle members 24a, 24b and 24c extend entirely across the interior of the tank 16 so as to divide the interior into a plurality of chambers, 26a, 26b, 26c, and 26d. A flow control baffle 28 extends across the interior of the tank in chamber 26d to create a downstream chamber 26e. Baffle 28 has an upper portion 28a spaced from the top of the tank 16 defining an overflow weir to control the level of water in the tank.

The contaminated water entering the inlet line 18 passes through an oil absorbing filter 30 disposed in an upper portion of chamber 26a. Baffle members 24a, 24b and 24c each define one or more water passages 32a, 32b and 32c, respectively allowing the water to pass from upstream chamber 26a, through chambers 26b and 26c and into chamber 26d. The height of each of the water passages 32 from the bottom of the tank progressively decreases in a downstream direction. Thus, water passages 32a are located a distance X above the bottom of the tank, water passages 36b are located a distance Y above the bottom of the tank and water passages 32c are located a distance Z above the bottom of the tank such that X is greater than Y which is greater than Z.

The rate of passage of the contaminated water from the upstream to the downstream end of the tank is sufficiently slow that contaminate particles may settle out towards the bottom of the tank. Drain plugs 34 may be provided to empty the water from the chambers, as well as to clean out the contaminants collected in the bottom of the tank. Access to the interior of the tank may be provided by one or more ports 36, if desired.

Water entering chamber 26d rises to the top 28a of water level control baffle 28 and passes into chamber 26e located between the control baffle 28 and the downstream end 22 of the tank 16. The height of the top 28a controls the level of water in the tank. The clarified water may then be withdrawn through outlet conduit 38 communicating with chamber 26e through downstream end 22. An overflow conduit 40 communicates with chamber 26e above the level of the top 28a of water level control baffle 28 to withdraw the water within the tank should it rise above level 28a. The overflow conduit 40 may be connected to an overflow sump 42 which, in turn, may be connected to water retention tank 44 via conduit 46.

System pressure pump 48 is connected to outlet conduit 38 as well as to water retention tank 44 and pumps the clarified water into a pressurized tank 50. Pressurized tank 50 may be a known variety of tank containing a pressurized flexible bladder so as to maintain a predetermined water pressure in the system via output conduit 52. This operation of system pressure pump 48 may also be controlled via an electrical connection to control float 49. The height of float 49 rises and falls with the water level in chamber 26e and will turn off pump 48 should the level fall below a predetermined minimum.

The system according to the invention also includes an ozone generator 54 connected to water recycling and ozone distribution pump 56. Pump 56 is also connected to outlet conduit 38 via conduit 38a. The outlet of pump 56 is connected to ozone distribution conduit 58 passing through the interior of tank 16. As best seen in FIG. 3, ozone distribution conduit 58 passes through baffle members 24a, 24b and 24c as well as chambers 26a, 26b, 26c and 26d. The conduit 58 may be perforated to distribute the ozone into the water retained in these chambers.

During times when the system is not being used for prolonged periods of time, the water recycling and ozone distribution pump 56 recirculates water from outlet conduit 38 via conduit 38a back into the internal chambers of the tank 16 via conduit 58 to prevent the water in the tank from becoming stagnant.

Although the location of the various components of the system will, of course, vary according to the requirements for each specific application of the system, it has been found convenient to mount the system pressure pump 48, the pressurized tank 50, the ozone generator 54, the water recycling and ozone distribution pump 56, as well as a filter 60 to remove solids connected to output conduit 52 on a pallet or skid 62 as illustrated in FIG. 4. The filter 60 comprises a known industrial, high capacity bag filter having its input connected to the output conduit 52 in order to remove any remaining solids in the water before it is used by the cleaning system. This enables all of the components to be assembled and tested prior to their installation at the use sight.

In contrast to other, known closed loop recycling systems, the present system has fewer moving parts, resulting in less down time for repair or replacement; requires fewer filters to filter out the oil, grease and scale; enables the use of washable and reuseable filters to minimize filter expense; and does not require the use of any chemicals.

The foregoing description is provided for illustrative purposes only and should not be construed as in any way limiting this invention, the scope of which is defined solely by the appended claims.

I claim:

1. A water purification tank comprising:
   (a) a plurality of baffle members extending across the tank to divide the interior of the tank into a plurality of chambers;
   (b) contaminated water inlet means in fluid communication with an upstream chamber;
   (c) a water passage defined by each of the baffles to allow water to pass through each baffle member into an adjacent downstream chamber, the height of each passage from the bottom of the tank being progressively lower from an upstream to a downstream direction;
   (d) a water level control baffle extending across the tank downstream of a baffle member, the water level control baffle being spaced from a top of the tank to define an overflow weir to control the water level within the tank, wherein each of said baffle members extends from the bottom of said tank to a point above the water level and each of said passages has an upper extent below the water level;
   (e) ozone distribution means connected to an ozone source, said ozone distribution means extending through at least one chamber to distribute ozone into the water located in the at least one chamber; and,
   (f) water outlet means located downstream of the water level control baffle.

2. The water purification tank according to claim 1 further comprising filter means disposed adjacent to the contaminated water inlet means.

3. The water purification tank according to claim 1 wherein the ozone distribution means comprises:
   an ozone distribution conduit connected to the ozone source and extending into at least one chamber in the tank.

4. The water purification tank according to claim 3 wherein the ozone distribution conduit extends approximately longitudinally through a plurality of chambers.

5. An ozone water purification system comprising:
   (a) a water purification tank comprising:
      (i) a plurality of baffle members extending across the tank to divide the interior of the tank into a plurality of chambers;
      (ii) contaminated water inlet means in fluid communication with an upstream chamber;
      (iii) a water passage defined by each of the baffles to allow water to pass through each baffle member into an adjacent downstream chamber, the height of each passage from the bottom of the tank being progressively lower from an upstream to a downstream direction;
      (iv) a water level control baffle extending across the tank downstream of a baffle member, the water level control baffle being spaced from a top of the tank to define an overflow weir to control the water level within the tank, wherein each of said baffle members extends from the bottom of said tank to a point above the water level and each of said passages has an upper extent below the water level;
      (v) water outlet means located downstream of the water level control baffle;
   (b) an ozone source; and,
   (c) an ozone distribution conduit extending from the ozone source and extending through at least one of the chambers in the tank to distribute ozone from the source into the water in the at least one chamber.

6. The system according to claim 5 further comprising a pressurized water storage tank connected to the water outlet means to maintain a predetermined water pressure in the system.

7. The system according to claim 6 further comprising filter means disposed within the tank adjacent to the contaminated water inlet means.

8. The system according to claim 5 further comprising:
(a) a water retention tank; and,
(b) overflow conduit means connecting the water retention tank and the water purification tank, the overflow conduit means communicating with a downstream chamber at a height greater than that of the overflow weir.

* * * * *